(12) United States Patent
Nelson et al.

(10) Patent No.: US 6,190,551 B1
(45) Date of Patent: Feb. 20, 2001

(54) RESERVOIR SHOWER FOR ROTARY VACUUM FILTER

(75) Inventors: Philip N. Nelson; David Tidwell, both of Monroe, LA (US)

(73) Assignee: Paper, Inc., Monroe, LA (US)

( * ) Notice: Under 35 U.S.C. 154(b), the term of this patent shall be extended for 0 days.

(21) Appl. No.: 09/224,578

(22) Filed: Dec. 31, 1998

(51) Int. Cl.[7] .......................... B01D 33/06; B01D 33/60
(52) U.S. Cl. ......................... 210/217; 210/391; 210/404
(58) Field of Search ................................ 68/200, 205 R; 162/276, 279; 210/217, 232, 391, 394, 402, 404, 406

(56) References Cited

U.S. PATENT DOCUMENTS

| | | | |
|---|---|---|---|
| 3,930,465 | * | 1/1976 | Schuierer . |
| 4,222,342 | * | 9/1980 | Johansson et al. . |
| 4,406,784 | * | 9/1983 | Cochran ................................ 210/168 |
| 4,563,244 | * | 1/1986 | Syed et al. . |
| 4,616,489 | * | 10/1986 | Wood et al. .......................... 68/200 |
| 4,670,099 | * | 6/1987 | LaValley ............................... 210/217 |
| 4,907,426 | * | 3/1990 | Wood et al. ........................... 210/217 |

* cited by examiner

*Primary Examiner*—David A. Simmons
*Assistant Examiner*—Frank M. Lawrence
(74) *Attorney, Agent, or Firm*—Rossi & Associates

(57) ABSTRACT

The invention provides a shower module that includes an upper elongated chamber, a supply pipe located in the upper elongated chamber, wherein the supply pipe includes at least one discharge opening that faces a side wall of the upper elongated chamber, a lower elongated chamber located adjacent to the upper elongated chamber, wherein fluid flow is provided between the lower elongated chamber and the upper elongated chamber via a transfer opening, and wherein the lower elongated chamber includes a discharge opening; and a coupling mechanism for coupling a flexible member to the lower elongated chamber beneath and substantially parallel to the discharge opening. When incorporated with a rotary vacuum filter, the flexible member causes a reservoir of shower liquid to form on a mat located on the shower drum. The reservoir conforms to the mat across the drum and does not have to be positioned to a nominal mat thickness, and provides a maximum area of coverage on the mat surface to give maximum washing efficiency.

14 Claims, 5 Drawing Sheets

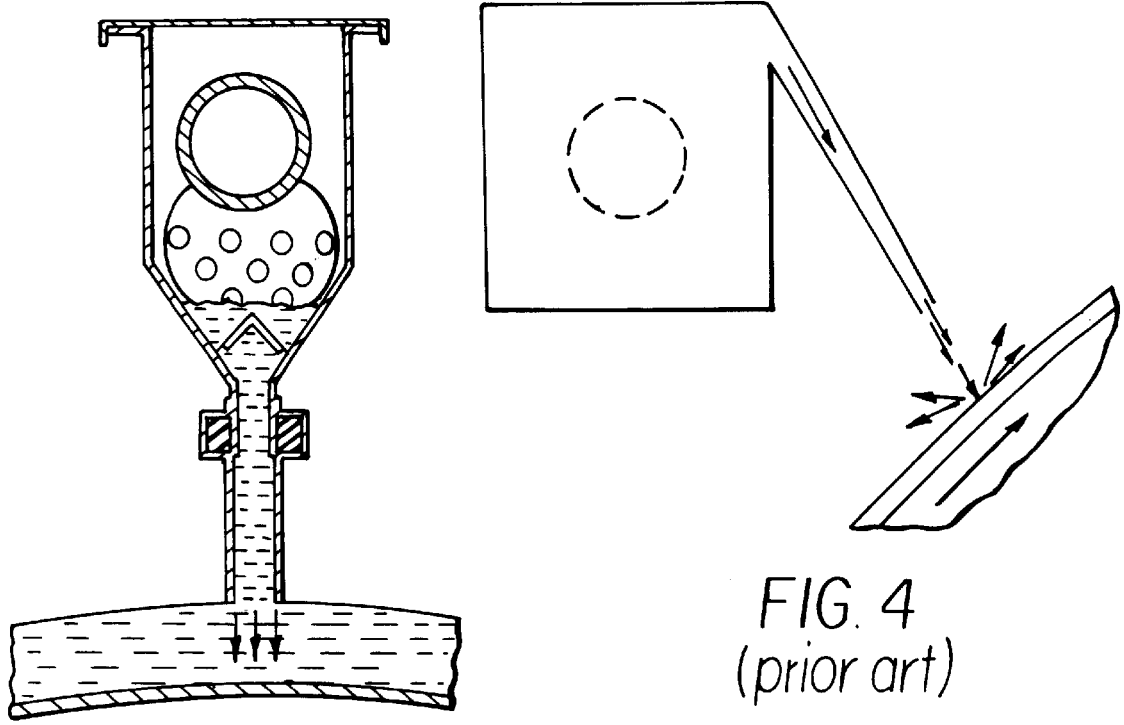
FIG. 5
(prior art)
FIG. 4
(prior art)
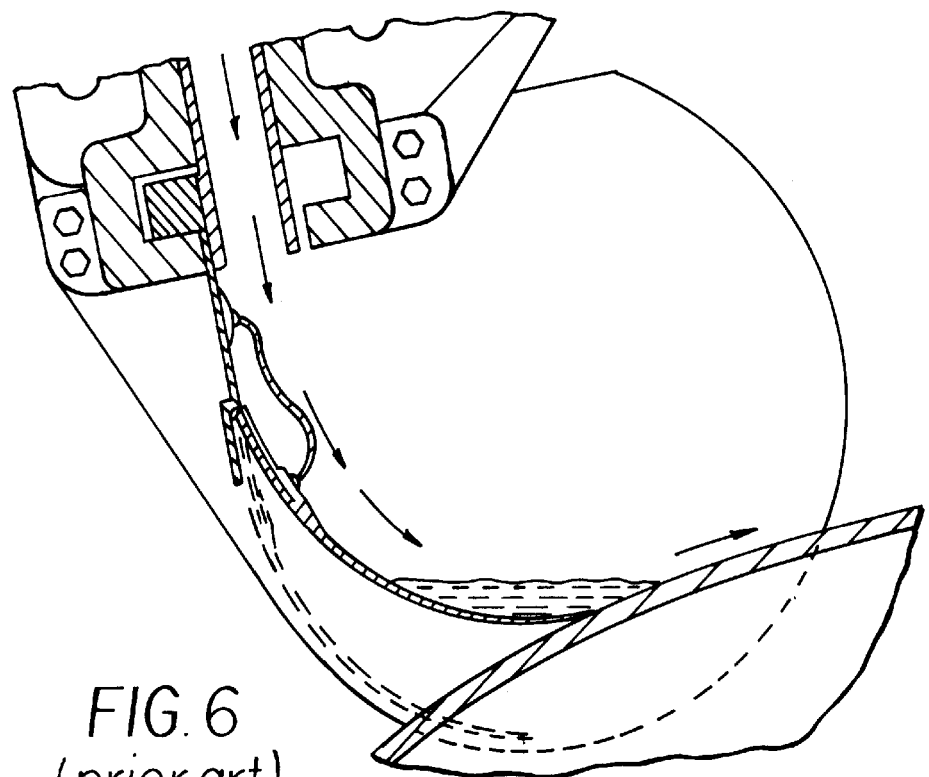
FIG. 6
(prior art)

RESERVOIR SHOWER FOR ROTARY VACUUM FILTER

FIELD OF INVENTION

The invention relates in general to atmospheric rotary vacuum filters in which a liquid passes through a porous mat on a filtering screen over a vacuum source. More specifically, the invention relates to a reservoir shower for use on an atmospheric rotary vacuum filter that improves washing efficiency.

BACKGROUND

The paper, sugar, textile and mining industries all have the need to separate large masses of porous materials that require washing to remove chemicals or other impurities. Rotary vacuum filters were introduced shortly after the turn of the twentieth century to separate minerals from dirt and water in the mining industry. A drum was rotated in a vat in which the minerals and water were suspended. A vacuum was created in a downleg of the rotary vacuum filter as clean shower liquid was sprayed on the surface of the rotating drum. The waste liquid passed through the drum under force of the vacuum leaving minerals entrapped on the drum surface. Rotary vacuum filters were subsequently utilized in the pulp and paper industry to separate pulp from the cooking or process liquids. Large amounts of liquid are used to remove these chemicals. The recovery of these washing chemicals has tremendous economic and environmental impact.

The oldest shower design is to spray shower liquid onto the mat with a shower pipe having openings that are dispersed across the length of the drum. The openings supply shower liquid onto spoons, whistles (as shown in FIG. 2) or parabolic lips which distribute the shower liquid tangential to the mat. These conventional shower designs, however, all give uneven distribution of the shower liquid across the drum because of overlapping spray patterns as shown in FIG. 3. The mat is therefore unevenly washed across the width of the drum. Further, the conventional shower designs can also waste shower liquid by applying more liquid than the mat will allow to pass into the drum during the time the mat is affected by the shower, thereby resulting in clean shower liquid rolling down the mat and being lost in the vat.

Another conventional shower design, known as a "Weir", is described in U.S. Pat. No. 4,511,088 and is illustrated in FIG. 4. In the weir shower, the shower liquid falls between a pair of plates down onto the mat. The weir shower, however, is sensitive to being kept absolutely level in order to achieve a consistent flow rate across the drum. Accordingly, normal wear and tear make it difficult to keep the weir flowing evenly across the drum.

A still further convention shower design, referred to as a "Uniflow" shower, is described in U.S. Pat. No. 4,616,489 and illustrated in FIG. 5, the uniflow shower includes an enlongated chamber placed axially above the drum. The lower portion of the chamber is narrow and structured such that a head of shower liquid builds up within the chamber to create a static liquid pressure which forces shower liquid to leave the chamber through a slot along its bottom. The head within the chamber causes shower liquid to flow out of the slot and through the mat. Additionally a pair of resilient skirts are attached to the slot and extend to the mat to guide the liquid perpendicularly to the mat and skirts, thus helping to force shower liquid through the mat. Also, depending on the location at which this shower is mounted, shower liquid can collect between one of the flexible skirts and the mat surface to form a standing puddle that extends across the width of the mat to facilitate uneven washing. This shower allows a standing body of liquid to form on the surface of the mat, but problems are created by the skirts contacting the mat surface at 90 degrees. The skirts are resilient and disturb the mat when at low consistency; therefore resulting in poor washing. Moreover, clumps on the surface of the mat may sometimes be knocked back into the vat instead of being smoothed into the surface of the mat. A still further disadvantage is that the width of the pond is too small for optimum washing and this design has no adjustment for mat thickness.

U.S. Pat. No. 4,907,426 discloses a shower structure, illustrated in FIG. 6, which has a fabric hinged arrangement with a rigid retainer with a distal edge. The shower liquid comes out and flows down into a lower portion of the elongated chamber which is narrow and structured such that a head of shower liquid builds up within the chamber to create a static liquid pressure which forces shower liquid to leave the chamber through a slot along its bottom. The vertically falling shower liquid hits a fabric hinge which breaks the fall, but causes eddy currents and turbulence. This hinge is also the pivotal point of the rigid retainer with a distal edge that has to be positioned to some nominal mat thickness. If production rates change the mat thickness can decrease to a point where a gap develops between the rigid distal edge and mat allowing the pond to drain away. Also, in pulp processing, lumps occur in the formed mat that can lift the entire rigid retainer and allow a gap to form between the retainers distal edge and the mat thus allowing the pond to drain away, thereby causing operational problems. Further, this shower design also creates problems in maintaining a substantial pond depth due to the fact that the amount of incoming shower liquid is limited by the hydraulic jump caused when high velocity liquid is discharged into a low velocity (pond) region thus causing an abrupt rise (wave) in the liquid surface.

In view of the above, it is an object of the invention to provide a shower that improves the washing efficiency of a rotary atmospheric vacuum filter.

SUMMARY OF THE INVENTION

The invention provides a shower module that includes an upper elongated chamber, a supply pipe located in said upper elongated chamber, wherein said supply pipe includes at least one discharge opening that faces a side wall of said upper elongated chamber, a lower elongated chamber located adjacent to said upper elongated chamber, wherein fluid flow is provided between said lower elongated chamber and said upper elongated chamber via a transfer opening, and wherein said lower elongated chamber includes a discharge opening; and a coupling mechanism for coupling a flexible member to the lower elongated chamber beneath and substantially parallel to the discharge opening. When incorporated with a rotary vacuum filter, the flexible member causes a reservoir of shower liquid to form on a mat located on the shower drum. The reservoir conforms to the mat across the drum and does not have to be positioned to a nominal mat thickness, and provides a maximum area of coverage on the mat surface to give maximum washing efficiency.

In a preferred embodiment, the coupling mechanism includes a hollow bolt having an opening that operates as the discharge opening. Shower liquid passing through the discharge opening preferably strikes the flexible member at an angle of about ninety degrees. The coupling mechanism further includes an upper support and a lower support that preferably comprise a hinge structure, thereby allowing the flexible member to be properly located on the mat.

Other advantages, features and objects of the invention will become apparent from the following detailed description of the preferred embodiments of the invention.

BRIEF DESCRIPTION OF THE DRAWINGS

The invention will be described in greater detail with reference to certain preferred embodiments and the accompanying drawings, wherein:

FIG. 4 illustrates a conventional weir shower;

FIG. 5 illustrates a conventional uniflow shower;

FIG. 6 illustrates a conventional shower using a fixed distal edge;

DETAILED DESCRIPTION OF PREFERRED EMBODIMENTS

Figure 1:
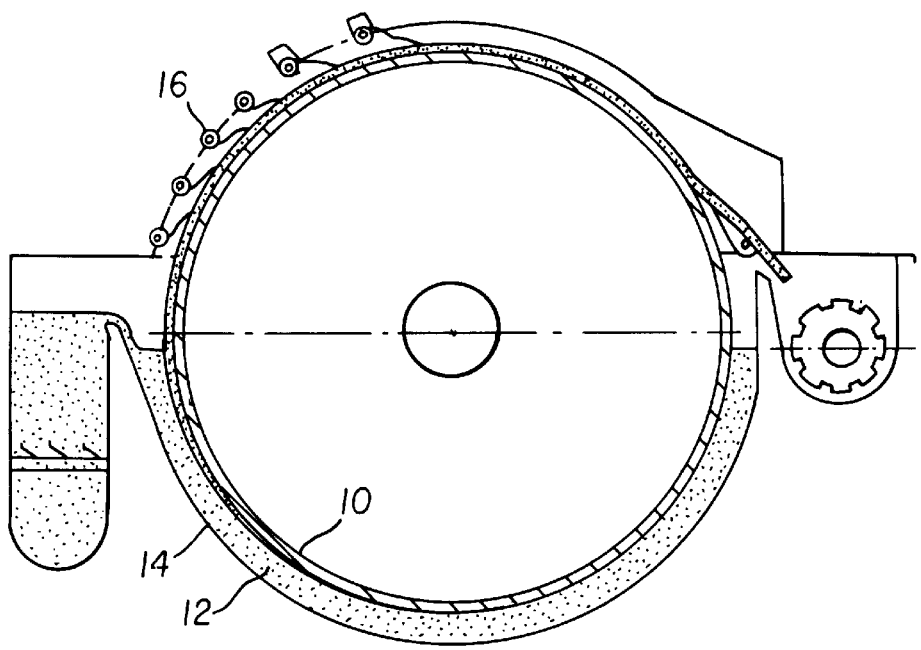
FIG. 1 illustrates a conventional atmospheric rotary vacuum filter which utilizes spray showers, a canopy hood exhaust and a natural dropleg.
Figure 2:
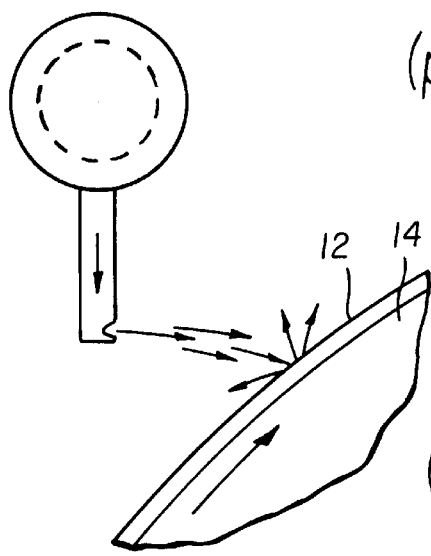
FIG. 2 illustrates an embodiment of a conventional whistle spray shower.

A conventional rotary vacuum filter will first be described with reference to FIG. 1. The conventional rotary vacuum filter includes a drum 10 that is suspended in a vat 14 containing a pulp slurry 12. Parallel shower pipes 16 are spaced at regular angular intervals around the drum 10 beginning at an approximately 9:30 starting position and ending at an approximately 11:30 ending position as defined by a clock face. The shower pipes 16 extend around the drum 10 are supported and fed from their respective ends by a header assembly (not shown). Each of the shower pipes 16 may includes showers such as spoons, whistles, parabolic lips or weirs as discussed above.

Figure 3:
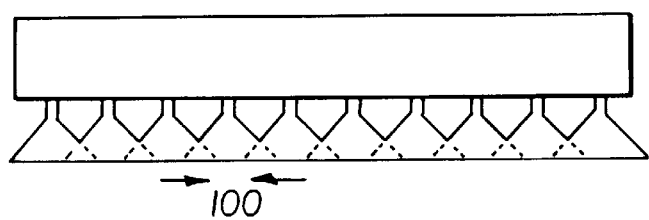
FIG. 3 illustrates the spray overlap from conventional spoons, whistle and lip showers.

Each of the above-described showers feeds shower liquid through an elongated chamber defined by a conduit into a slot or hole along the face of the chamber. The pressure of shower liquid within chamber forces the shower liquid out of slot or holes and directs it in a stream towards the mat. Some of the shower liquid in the stream passes through the mat to clean it, but the remainder of the liquid is deflected away from the surface of mat and rolls down the mat into the pulp vat. Each of the conventional shower designs waste shower liquid by overlapping sprays 100 across the drum face as shown in FIG. 3.

Figure 7:
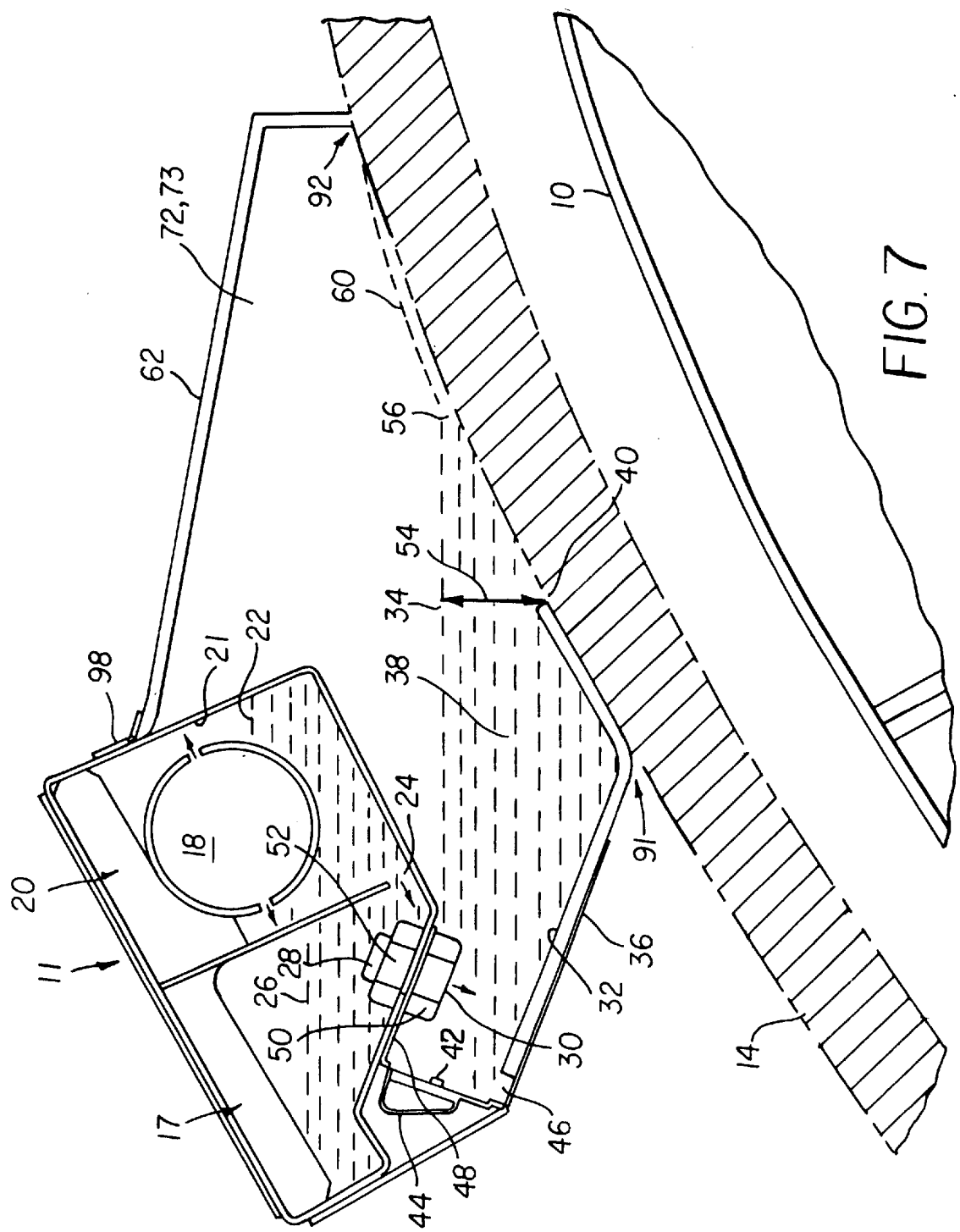
FIG. 7 illustrates a reservoir shower in accordance with the present invention.

A reservoir shower module 11 in accordance with the present invention is illustrated in FIG. 7. The shower liquid enters an upper elongated chamber 20 thru a supply pipe 18 (square or rectangle) that extends across the length of a filter drum 10. The shower liquid is preferably discharged from the pipe 18 into the lower part of elongated chamber 20 by two slots located 180 degrees apart, although other discharge opening configurations may be employed. The shower liquid hits the sides 21 of the upper elongated chamber 20 and flows downward forming a liquid level 22. The shower liquid then flows thru a bottom slot 24 in the bottom part of upper elongated chamber 20 into a lower elongated chamber 17, i.e., the bottom slot 24 provides for fluid communication between the upper elongated chamber 20 and the lower elongated chamber 17. A liquid level 26 is maintained in lower elongated chamber chamber 17. The shower liquid then exits the lower elongated chamber 17 at a discharge or exit opening 28, which—in a preferred embodiment—is an opening formed in a hollow bolt 50 secured by of a nut 52. The shower liquid exits the hollow bolt 50 at opening 30 and forms a reservoir 38. The opening 30 is located at an approximate ninety degree striking angle to a flexible membrane 32. A support 36 maintains the flexible member 32 substantially parallel to the opening 30. The fluid flow path thus created decreases the shower liquid momentum sufficiently to prevent disturbances from occurring in the reservoir 38.

The support 36 that supports the flexible membrane 32 includes an upper support member 48 and a lower support member 46. Lower support member 46 preferably extends down to within 3 to 4 inches of the drum surface 10, and the flexible membrane 32 extends past the end of the lower support member 46 to ride on the mat 14 located on the filter drum 10 regardless of mat thickness or production rates. The liquid reservoir 38 created has a significant depth or head 54 between the end 40 of the flexible membrane 32 and the surface of the reservoir 34. As the filter drum 10 rotates clockwise, a liquid film 60 is created over the mat, thereby essentially sealing the mat from points 91 to 92 with the displacement washing surface area being from point 40 to 92. The resultant effect is essentially three zones of washing, namely, a compression wash zone from point 91 to the end 40 the flexible membrane 32 that exerts a compression froce on the mat 14 due to the weight of the water in the reservoir, a reservoir wash zone from the end 40 of the flexible membrane 32 to the point 56 where the surface of the reservoir 34 meets the mat 14, and a supplemental wash zone due to the extending liquid film 60.

In order to allow the flexible membrane 32 to properly ride on the mat 14, a hinge 42 is provided to couple the upper support member 48 to the lower support member 46. The upper support member 48 is bolted onto a lower part of the lower elongated chamber 17 by the hollow bolt 50 and nut 52. A back stop 44 is provided to keep the lower support member 46 in the proper position.

The shower module also includes side panels 72, 73 and a top cover 62 that is coupled to the upper elongated chamber 20 by a hinge 98. The sealing of the side panels 72, 73 is accomplished by connecting the reservoir shower module 11 to end shields 70 and coupling the side panels 72, 73 to the drum 10 by one of two side seal designs illustrated by FIGS. 8 and 9. Both side seal designs extend thru arc 99 of FIG. 10.

Figure 8:
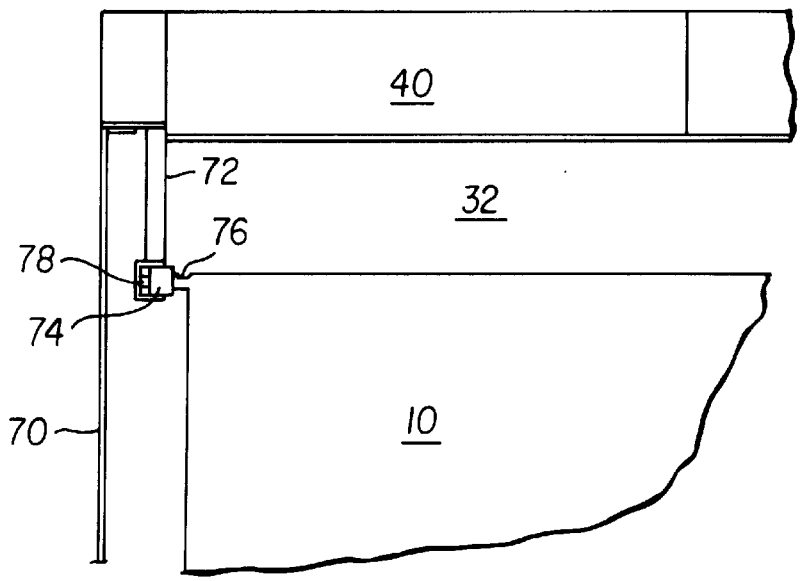
FIG. 8 illustrates a horizontal side seal utilized in the present invention.
Figure 10:
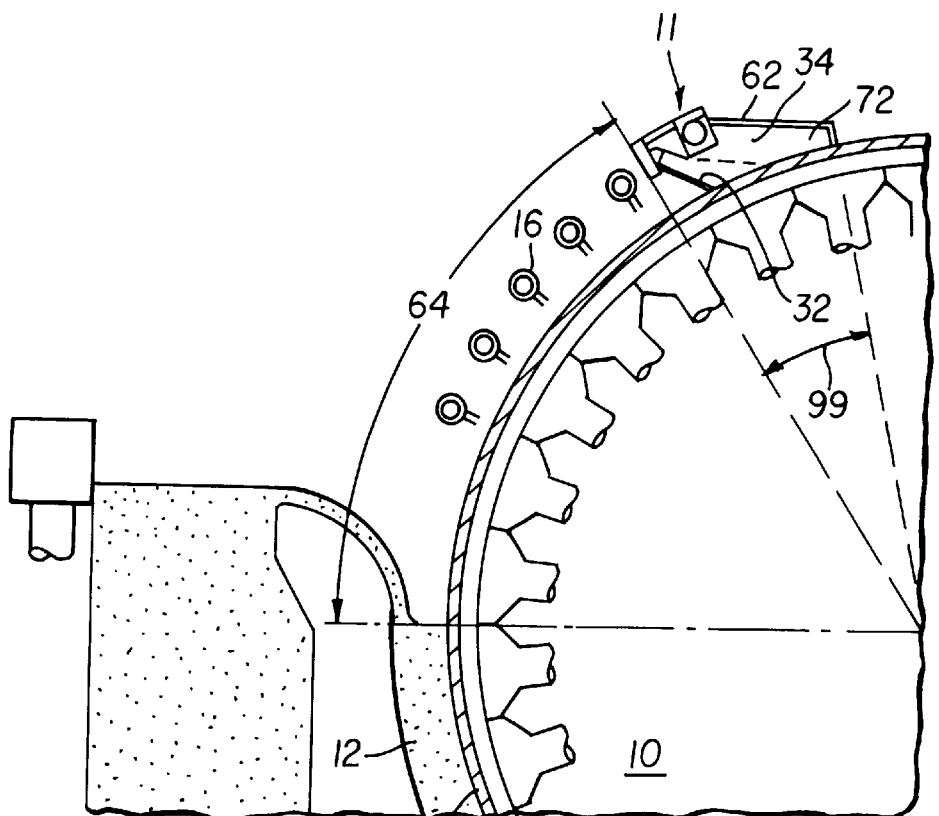
FIG. 10 illustrates side view showing the placement of the reservoir shower.

FIG. 8 illustrates how the reservoir shower side seal rests on the splash shields 70 of a vat structure 12 of FIG. 10. Side seal assembly is provided on both ends of reservoir shower module 11 that includes a horizontal side seal 74 that is pressed against end band 76 by a spring or Tygon (tm) element 78. The side seal 74 must be manually placed against end band 76 before lowering shower module 40 into place.

Figure 9:
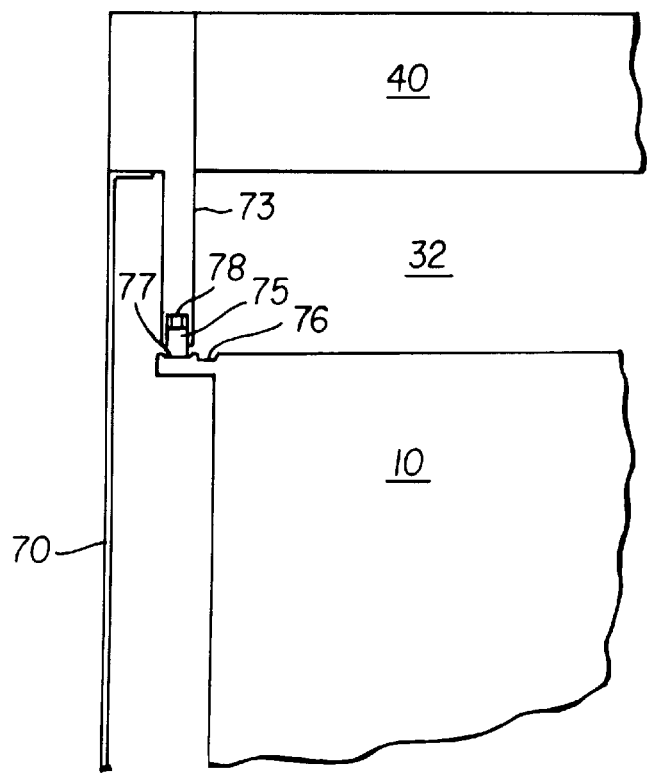
FIG. 9 illustrates the vertical side seal utilized in the present inventon.

FIG. 9 illustrates a vertical side seal that does not require manual manipulation before lowering the reservoir module 11 into end band extension 77. Note that the original end band 76 has been extended 77 so that the vertical seal 75 can be pressed downward by a spring or Tygon element 78.

FIG. 10 illustrates the primary preferred location for the reservoir shower module 11. A cover plate 62 that is coupled to the upper elongated chamber 20 can be used if contaminated condensed condensates are used as the shower liquid source. The cover plate 62 is preferably hinged and rests on side plates 72, 73.

Figure 11:
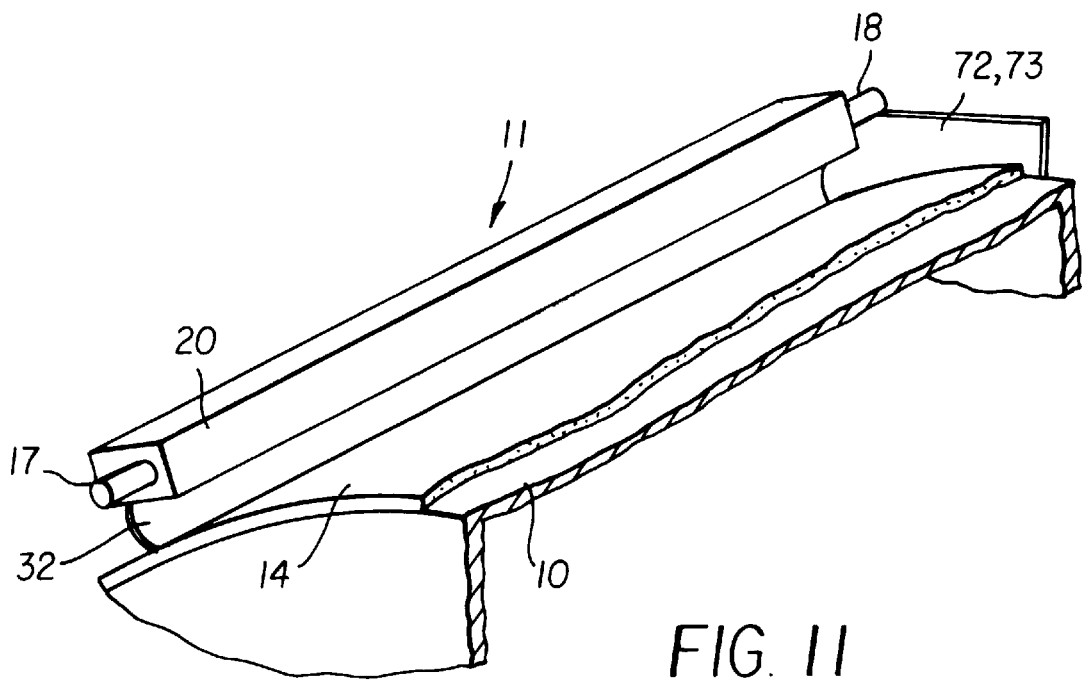
FIG. 11 illustrates an isometric view of the reservoir shower in accordance with the present invention.

FIG. 11 illustrates an isometric of the reservoir shower module 11 in relation to filter drum 10 and mat 14. The shower liquid enters pipe 18 and flows thru chamber 20 into chamber 17 in order to form the reservoir supported by flexible membrane 32 that continually rides on mat 14.

The reservoir shower provides a number of advantages that improves the washing efficiency of a rotary atmospheric vacuum filter. The reservoir shower maintains a continuous and significant reservoir by utilizing a flexible membrane retainer that in effect conforms to the mat across the drum and does not have to be positioned to a nominal mat thickness as in prior art. Further, incoming shower liquid is in a zone separate from the zone that provides the shower liquid exit via nozzles or slots. The secondary chamber supplies uniform low velocity flow and is not as sensitive to the shower being absolutely level. Still further, the flexible membrane serves as the top seal when full enclosure of the lower wash zone is required, as described and claimed in U.S. Pat. No. 5,965,017 entitled "Sealed Shower System for Rotary Vacuum Filter" filed Jul. 15, 1997, the contents of which are incorporated herein by reference. The reservoir shower can be totally enclosed for environmental reasons such as running combined fouled condensates as the source of shower liquid. In addition, the weight of the standing reservoir of liquid provides a gentle pressure on the flexible membrane generating displacement of chemicals in the mat before the mat is exposed to reservoir shower liquid. The upper reservoir also enables two stage washing by using the reservoir discharge as the shower supply for the lower wash zone, if the entire wash zone is sealed. Yet further, the flexible membrane of the reservoir enables lumps to pass beneath without disturbing the reservoir, and the dual chambers of the shower inlet in order to bring the shower liquid into the reservoir at low velocity.

The invention has been described with reference to certain preferred embodiments thereof. It will be understood, however, that modifications and variations are possible with the scope of the appended claims.

What is claimed is:

1. A shower module comprising:

an upper elongated chamber;

a supply pipe located in said upper elongated chamber, wherein said supply pipe includes at least one discharge opening that faces a side wall of said upper elongated chamber;

a lower elongated chamber located adjacent to said upper elongated chamber, wherein fluid flow is provided between said lower elongated chamber and said upper elongated chamber via a transfer opening, and wherein said lower elongated chamber includes a discharge opening; and coupling means for coupling a flexible member to the lower elongated chamber beneath, opposite and substantially parallel to the discharge opening of said lower elongated chamber, wherein an axis passing through a center of the discharge opening of said lower elongated chamber intersects said flexible member.

2. A shower module as claimed in claim 1, wherein said coupling means includes a hollow bolt having an opening that comprises said discharge opening of said lower elongated chamber.

3. A shower module as claimed in claim 1, wherein shower liquid passing through said discharge opening strikes said flexible member at an angle of about ninety degrees.

4. A shower module as claimed in claim 2, wherein said coupling means includes an upper support and a lower support.

5. A shower module as claimed in claim 4, wherein said upper support and said lower support are coupled by a hinge.

6. A shower module as claimed in claim 1, further comprising means for sealing side panels of said shower module.

7. A shower module as claimed in claim 1, further comprising a cover plate coupled to said upper elongated chamber.

8. A rotary vacuum filter comprising:

a filter drum; and at least one reservoir shower located adjacent to the filter drum;

wherein said reservoir shower includes:

an upper elongated chamber;

a supply pipe located in said upper elongated chamber, wherein said supply pipe includes at least one discharge opening that faces a side wall of said upper elongated chamber;

a lower elongated chamber located adjacent to said upper elongated chamber, wherein fluid flow is provided between said lower elongated chamber and said upper elongated chamber via a transfer opening, and wherein said lower elongated chamber includes a discharge opening; and coupling means for coupling a flexible member to the lower elongated chamber beneath, opposite and at an angle substantially parallel to the discharge opening of said lower elongated chamber, wherein said flexible member retains a reservoir of shower liquid on a mat located on said filter drum during operation of said filter drum.

9. A rotary vacuum filter shower as claimed in claim 8, wherein said coupling means includes a hollow bolt having an opening that comprises said discharge opening of said lower elongated chamber.

10. A rotary vacuum filter as claimed in claim 8, wherein shower liquid passing through said discharge opening and strikes said flexible member at an angle of about ninety degrees.

11. A rotary vacuum filter as claimed in claim 9, wherein said coupling means includes an upper support and a lower support.

12. A rotary vacuum filter as claimed in claim 11, wherein said upper support and said lower support comprises a hinge.

13. A rotary vacuum filter as claimed in claim 8, further comprising means for sealing side panels of said shower module.

14. A rotary vacuum filter as claimed in claim 8, further comprising a cover plate coupled to said upper elongated chamber.

* * * * *